(12) United States Patent
Rex

(10) Patent No.: US 11,665,249 B2
(45) Date of Patent: May 30, 2023

(54) SERVICE TRUST CHAIN

(71) Applicant: Peter L. Rex, Bellevue, WA (US)

(72) Inventor: Peter L. Rex, Bellevue, WA (US)

(73) Assignee: Peter L. Rex, Bellevue, WA (US)

( * ) Notice: Subject to any disclaimer, the term of this patent is extended or adjusted under 35 U.S.C. 154(b) by 0 days.

(21) Appl. No.: 17/353,700

(22) Filed: Jun. 21, 2021

(65) Prior Publication Data

US 2021/0400119 A1 Dec. 23, 2021

Related U.S. Application Data

(60) Provisional application No. 63/041,560, filed on Jun. 19, 2020.

(51) Int. Cl.
*H04L 67/53* (2022.01)
*G06Q 10/06* (2023.01)
*G06Q 30/02* (2023.01)
*G06Q 10/0639* (2023.01)
*G06Q 30/0217* (2023.01)

(52) U.S. Cl.
CPC ....... *H04L 67/53* (2022.05); *G06Q 10/06395* (2013.01); *G06Q 30/0217* (2013.01)

(58) Field of Classification Search
CPC .............. H04L 67/20; G06Q 10/06395; G06Q 30/0217
USPC ........................................................ 709/219
See application file for complete search history.

(56) References Cited

U.S. PATENT DOCUMENTS 6,970,831 B1 * 11/2005 Anderson .......... G06Q 30/0203
186/35
8,756,085 B1 6/2014 Plummer et al.
8,775,570 B2 7/2014 Sandholm
10,222,301 B2 3/2019 Da Silva
10,423,934 B1 * 9/2019 Zanghi ................. G05D 1/0225
10,529,028 B1 1/2020 Davis
(Continued)

FOREIGN PATENT DOCUMENTS

WO 199715023 A2 4/1997
WO WO199715023 A2 4/1997
(Continued)

OTHER PUBLICATIONS

International Search Report dated Jul. 27, 2021 for International Application No. PCT/US21/29678.
(Continued)

*Primary Examiner* — James E Springer
(74) *Attorney, Agent, or Firm* — PG Scott Born; FishersBroyles LLP

(57) ABSTRACT

At least one computer-readable medium on which are stored instructions that, when executed by one or more processing devices, enable the one or more processing devices to perform a method. The method includes the steps of providing over a network a request for first information from a second service provider at a job site characterizing a first service provided by a first service provider at the job site, receiving over the network from the second service provider the first information, providing over the network a request for second information from a third service provider at the job site characterizing a second service provided by the second service provider at the job site, and receiving over the network from the third service provider the second information.

9 Claims, 3 Drawing Sheets

(56) References Cited

U.S. PATENT DOCUMENTS

| | | | |
|---|---|---|---|
| 10,679,301 B1 | 6/2020 | Veliche | |
| 10,832,345 B1 | 11/2020 | Santos | |
| 11,032,328 B1 | 6/2021 | Little | |
| 11,132,481 B1 | 9/2021 | Davis | |
| 2004/0215701 A1* | 10/2004 | Vrajich | H04L 41/5009 709/201 |
| 2010/0223581 A1 | 9/2010 | Manolescu et al. | |
| 2010/0235228 A1 | 9/2010 | Torress | |
| 2011/0137745 A1 | 6/2011 | Goad et al. | |
| 2011/0282793 A1 | 11/2011 | Mercuri et al. | |
| 2012/0072268 A1* | 3/2012 | Ritter | G06Q 10/06 705/7.39 |
| 2012/0316930 A1* | 12/2012 | Clemenson | G06Q 10/06 705/7.39 |
| 2013/0036069 A1* | 2/2013 | Salloum | G06Q 30/0278 705/347 |
| 2013/0171593 A1 | 7/2013 | Gorman et al. | |
| 2014/0108078 A1 | 4/2014 | Davis | |
| 2014/0156681 A1 | 6/2014 | Lee et al. | |
| 2014/0235197 A1 | 8/2014 | Corner et al. | |
| 2014/0324450 A1 | 10/2014 | Hicks et al. | |
| 2014/0324696 A1 | 10/2014 | Browne et al. | |
| 2014/0365256 A1 | 12/2014 | Duff | |
| 2015/0142906 A1 | 5/2015 | Tolcher | |
| 2015/0149349 A1 | 5/2015 | Lee | |
| 2015/0213716 A1 | 7/2015 | Goel | |
| 2016/0071162 A1 | 3/2016 | Ogawa et al. | |
| 2016/0148363 A1 | 5/2016 | Phan et al. | |
| 2016/0292371 A1 | 10/2016 | Alhimiri | |
| 2017/0147991 A1 | 5/2017 | Franke | |
| 2018/0158156 A1 | 6/2018 | Dintenfass | |
| 2018/0159838 A1 | 6/2018 | Dintenfass | |
| 2018/0293669 A1* | 10/2018 | Jackson | G06Q 50/01 |
| 2018/0373931 A1 | 12/2018 | Li | |
| 2019/0020817 A1 | 1/2019 | Shan et al. | |
| 2019/0095832 A1 | 3/2019 | Frederico et al. | |
| 2019/0172161 A1 | 6/2019 | Conboy | |
| 2019/0180105 A1 | 6/2019 | Sasson | |
| 2019/0236732 A1 | 8/2019 | Speasl et al. | |
| 2020/0117336 A1 | 4/2020 | Mani | |
| 2020/0184706 A1 | 6/2020 | Speasl et al. | |
| 2020/0398083 A1* | 12/2020 | Adelsheim | A61N 5/1075 |
| 2021/0081698 A1 | 3/2021 | Lindeman | |
| 2021/0174492 A1 | 6/2021 | Karaasian | |
| 2021/0390482 A1* | 12/2021 | Rex | G06Q 10/02 |
| 2021/0390595 A1* | 12/2021 | Rex | G06Q 30/0283 |
| 2022/0203617 A1* | 6/2022 | Pekic | B29C 64/40 |

FOREIGN PATENT DOCUMENTS

| | | |
|---|---|---|
| WO | WO2018208226 A1 | 11/2018 |
| WO | WO2019144317 A1 | 8/2019 |

OTHER PUBLICATIONS

International Search Report dated Jul. 27, 2021 for International Application No. PCT/US21/29695.

International Search Report dated Jul. 27, 2021 for International Application No. PCT/US21/29723.

International Search Report dated Aug. 5, 2021 for International Application No. PCT/US21/29730.

International Search Report dated Aug. 3, 2021 for International Application No. PCT/US21/29612.

International Search Report dated Sep. 30, 2021 for International Application No. PCT/US21/38225.

International Search Report dated Sep. 30, 2021 for International Application No. PCT/US21/38271.

International Search Report dated Sep. 15, 2021 for International Application No. PCT/US21/38293.

International Search Report dated Oct. 1, 2021 for International Application No. PCT/US21/38308.

* cited by examiner

SERVICE TRUST CHAIN

PRIORITY CLAIM

This application claims priority from U.S. Provisional Patent Application Ser. No. 63/041,560 filed Jun. 19, 2020, the entirety of which is hereby incorporated by reference as if fully set forth herein.

BACKGROUND

Several challenges exist in completing certain construction projects. The struggle for the owner or ultimately responsible service provider is that most jobs of a high-dollar amount include multiple contractors doing different jobs, usually in sequence. Quality assurance and holding each service provider accountable for their performance or lack thereof is critical to fairness and product delivery quality on scale. The current methods require a person to physically show up in between each job to check on the quality or instead use a single larger company to deliver the finished repair or construction job (which may then require the consistent presence of a foreman or supervisor throughout). This is very costly. Absent such oversight though, there are sloppy handoffs, finger pointing, etc.

DRAWING FIGURES

DETAILED DESCRIPTION

Figure 1:
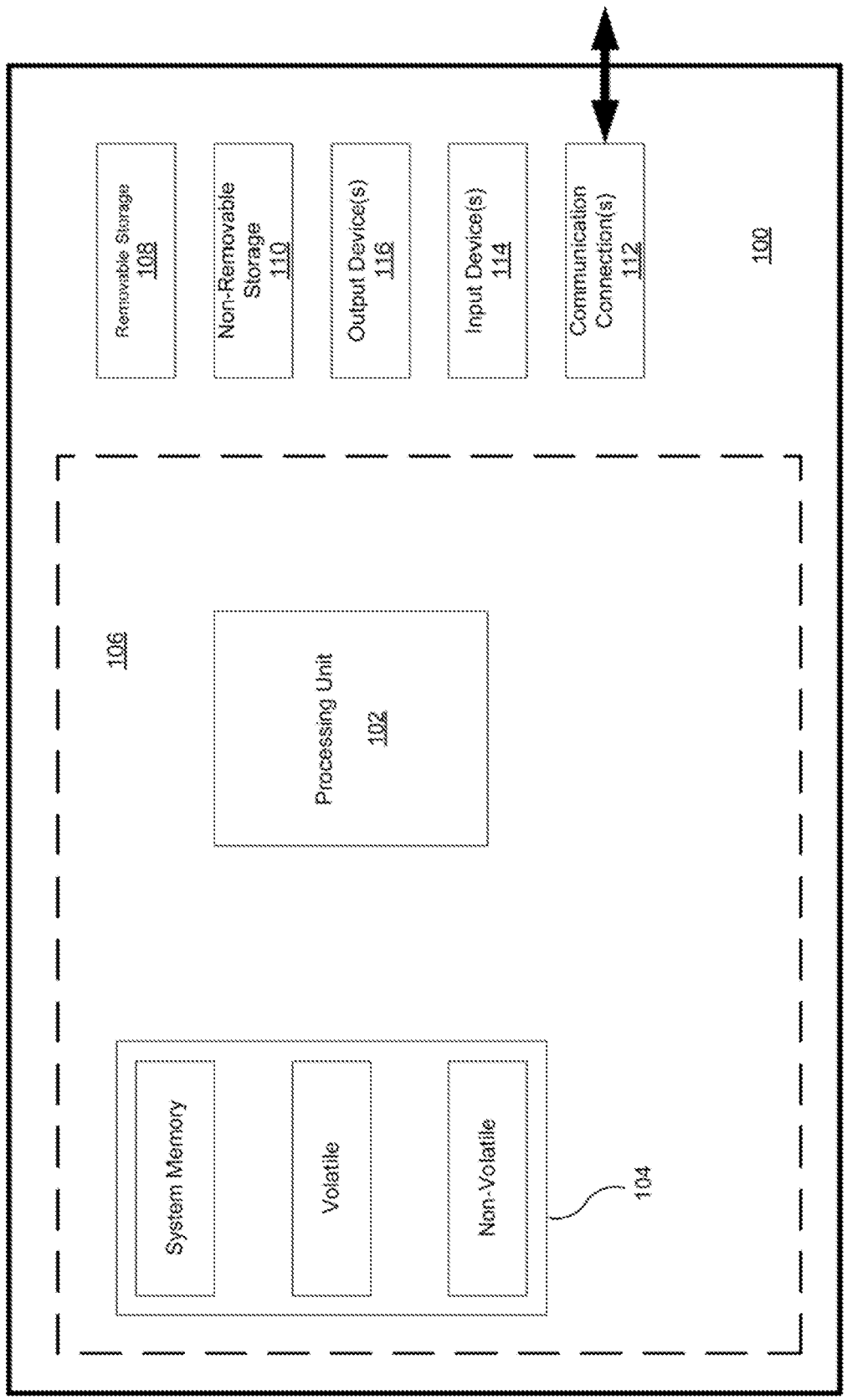
FIG. 1 is a schematic view of an exemplary operating environment in which an embodiment of the invention can be implemented.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices and can be used to implement or otherwise perform practical applications.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

With reference to FIG. 1, an exemplary system for implementing an embodiment of the invention includes a computing device, such as computing device 100, which, in an embodiment, is or includes a smartphone. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared, cellular and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
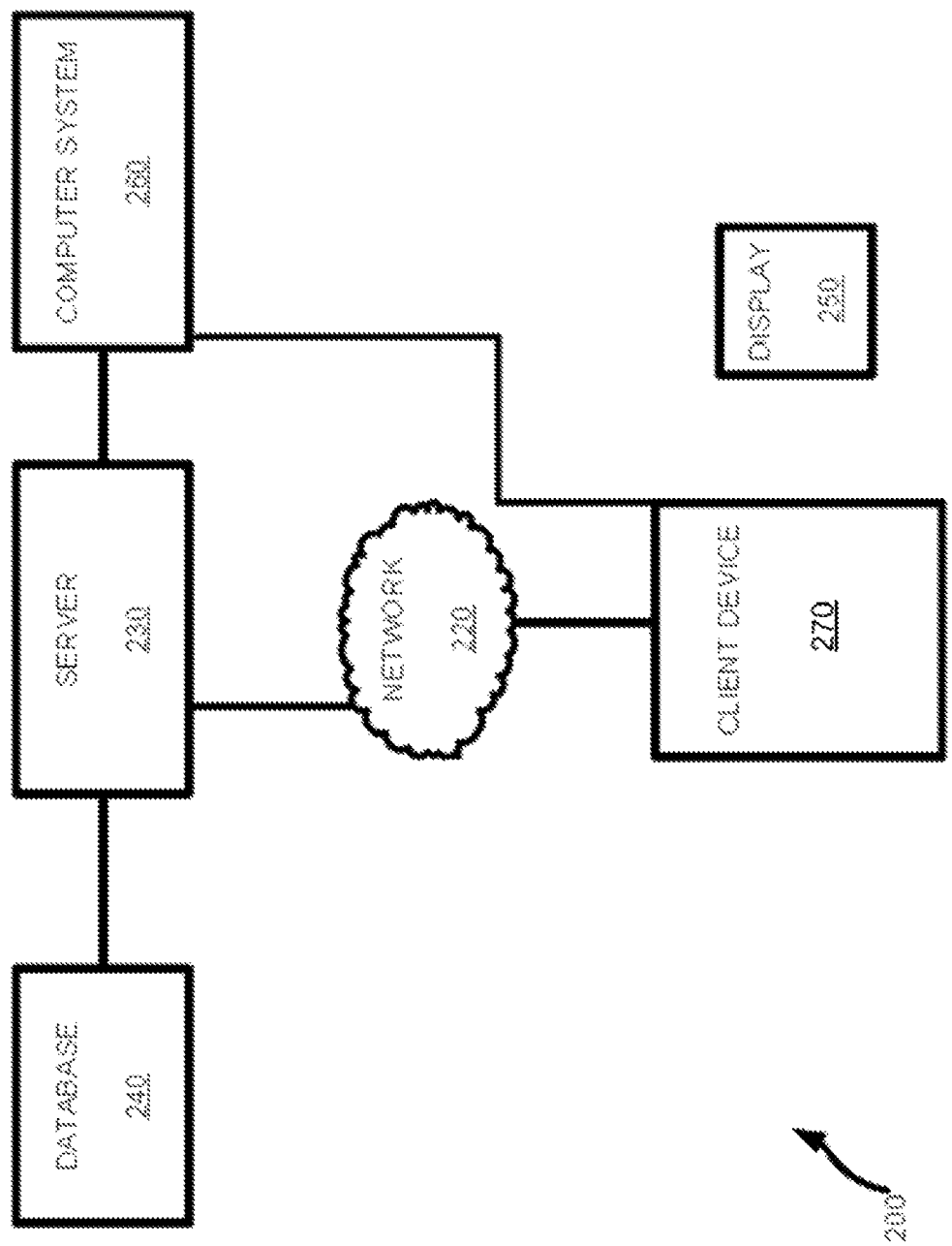
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 200 that, in an embodiment, includes a server 230, database 240 and computer system 260. The system 200 may communicate with an electronic client device 270, such as a personal computer or workstation, tablet or smartphone, that is linked via a communication medium, such as a network 220 (e.g., the Internet), to one or more electronic devices or systems, such as server 230. The server 230 may further be coupled, or otherwise have access, to a database 240 and a computer system 260. Although the embodiment illustrated in FIG. 2 includes one server 230 coupled to one client device 270 via the network 220, it should be recognized that embodiments of the invention may be implemented using one or more such client devices coupled to one or more such servers.

The client device 270 and the server 230 may include all or fewer than all of the features associated with the device 100 illustrated in and discussed with reference to FIG. 1. The client device 270 includes or is otherwise coupled to a computer screen or display 250. The client device 270 may be used for various purposes such as network- and local-computing processes.

The client device 270 is linked via the network 220 to server 230 so that computer programs, such as, for example, a short message service (SMS) application, running on the client device 270 can cooperate in two-way communication with server 230. The server 230 may be coupled to database 240 to retrieve information therefrom and to store information thereto. Database 240 may have stored therein data (not shown) that can be used by the server 230 and/or client device 270 to enable performance of various aspects of embodiments of the invention. The data stored in database 240 may include, for example, information identifying customers, goods/services previously requested by such customers and providers of those goods/services. Additionally, the server 230 may be coupled to the computer system 260 in a manner allowing the server to delegate certain processing functions to the computer system. In an embodiment, most or all of the functionality described herein may be implemented in a desktop or smartphone application that may include one or more executable modules. In an embodiment, the client device 270 may bypass network 220 and communicate directly with computer system 260.

An embodiment of the invention leverages already-on-site professionals who have "skin in the game" (i.e., their own reputation) to assess the quality of a job previously performed on-site by another professional as well as assessing the quality of their own performance. This further serves to create an awareness that the next professional to render on-site services will be providing a similar assessment. The professional's incentive in verifying the previous job is to be detailed and critical so as to avoid such professional's being blamed by the next contractor for work that was done incorrectly or sloppily. An embodiment can leverage GPS and time-stamp data to verify the sequence and location of service performance. Each subsequent professional who arrives at a job site can generate an assessment of previously done work by, for example, filling out a Quality Assurance (QA) form on a processing device, such as a smartphone, and taking photos of the job site to assist in documenting the type of work previously done and the standards to which such work was performed. The professional can then anonymously submit the assessment including supporting documentation before performing his appointed task(s). The information/assessment received is compared to assessment(s) provided by any previous contractor(s), thereby promoting assurance that each task is performed to the highest standard.

The credibility of a rating given to the performance of a first professional at a job site by a professional who previously worked at the job site can be strengthened or weakened by degree-of-corroboration with a rating of the first professional's performance given by a professional working at the job site later-in-time. Professionals can be rewarded points and or compensation by providing such ratings. An embodiment may include a user interface that can be generated on a client device 270, such as a smartphone, and that can provide to on-site professionals questions that require the professional to be present at the job site to answer, thereby providing a high degree of auditing assurance of site job assessment accuracy when in combination with other data stored on the system. For example, "please inspect the kitchen sink counter, taking a photo of the surface and under the counter, and check to see if the water runs and drains when turned on." Such a question could be random and different each time but can facilitate effective audit checks of the work of a kitchen-install project that may have included many appliances, counters, cabinets, flooring, etc.

In an embodiment, each particular on-site job may have a corresponding and identifying reference code that is stored in, for example, database 240. Database 240 may also store a predetermined set of questions germane to each respective on-site job such as that described in the immediately preceding paragraph with regard to installation of a kitchen sink. As such, system 200 may automatically, and without manual input, provide one or more of such questions to the professionals based on one or more particular jobs to be performed at the site using the corresponding identifying reference code(s).

One or more embodiments may employ the following technologies: mobile phones, software application created for phone, and a camera.

In a system 200 according to an embodiment, which may include a processing device and a memory as discussed above herein, a method of quality control is applied to property services in which a professional can provide quality-assessment feedback on the work of another professional who previously performed work at the same site. The pro may be incentivized to submit such quality-assessment both monetarily and with a point-based reputation management system. The accuracy of the feedback provided by the pro may be estimated using algorithms and machine learning and weighted as such. If a pro offers feedback that is estimated by the system to be highly accurate, the system can reward such behavior both monetarily and with a point-based reputation management system.

Figure 3:
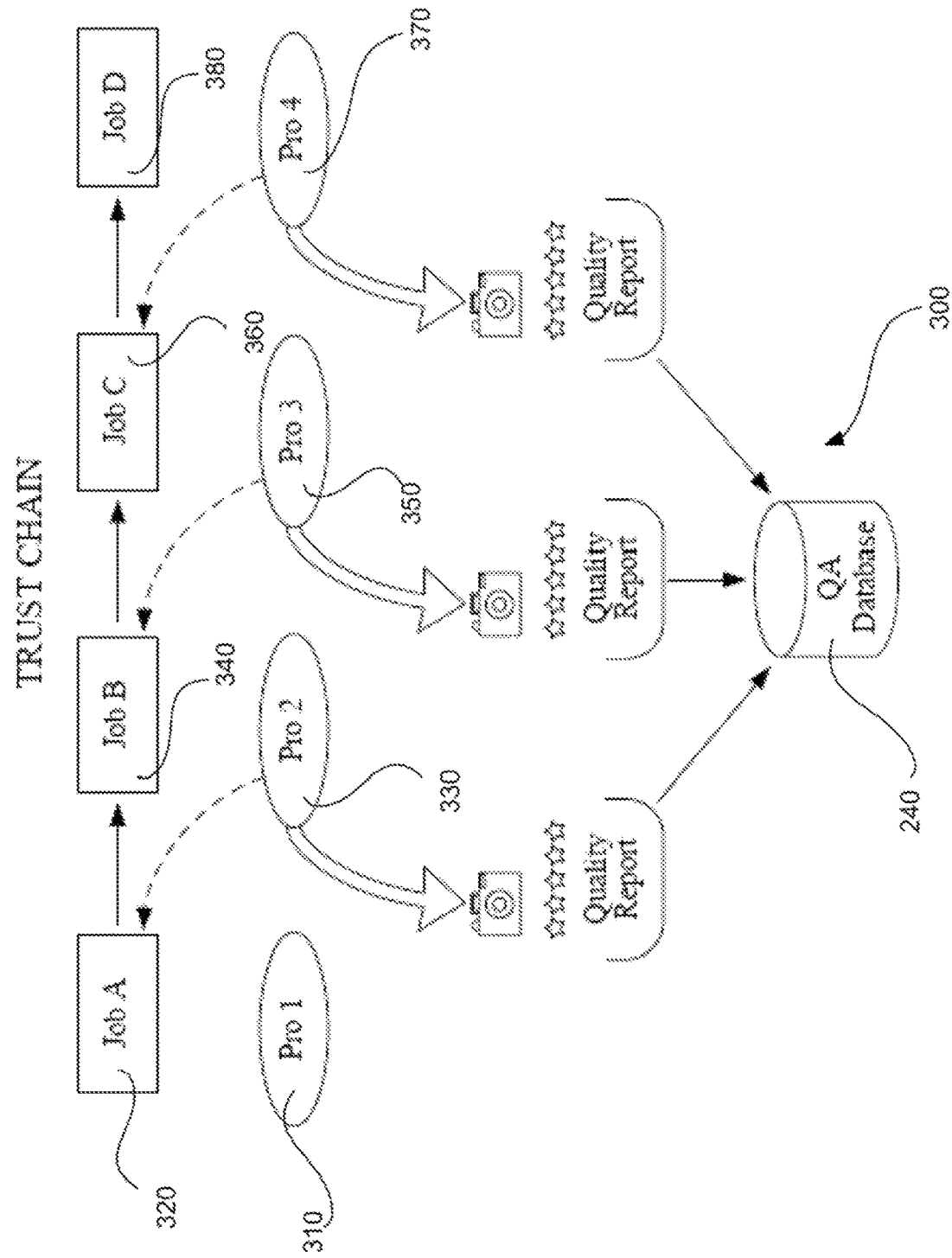
FIG. 3 is a schematic illustration of a process according to an embodiment of the invention.

Referring generally to FIG. 3, and by way of exemplary process 300, Pro 1 310 completes Job A 320 at a unit. Pro 2 330 then arrives at the unit to start Job B 340. Perhaps in response to random questions referenced above and provided by, for example, server 230, Pro 2 330 may electronically submit to database 240 an anonymous quality report of Job A 320 with photos, ratings, and textual information. Pro 2 330 completes Job B 340. Pro 3 350 arrives at the unit to start Job C 360. Similarly, and perhaps in response to random questions referenced above, Pro 3 350 may electronically submit an anonymous quality report of Job B 340 with photos, ratings, and textual information. Pro 3 350 completes Job C 360. Pro 4 370 arrives at the unit to start Job D 380. Similarly, and perhaps in response to random questions referenced above, Pro 4 370 may electronically submit anonymous quality report of Job C 360 with photos, ratings, and textual information. Pro 4 370 completes Job D 380. This process continues indefinitely with Pro N optionally submitting anonymous quality reports on the work of pro N-1, pro N-2 and possibly any other pro who has worked on the same site.

One or more embodiments may include the features described herein below.

Mobile phone application or SMS messaging system to request Pro QA report.

Interface to allow for multiple qualitative and quantitative feedback methods.

The system can smartly prompt specific questions to a pro that effectively audit check the previous work of other pros without creating a highly burdensome audit checklist to be filled out. These questions would be capturing only small aspects of the work quality with the hope of making it very easy for the pro to answer. If multiple pros are involved, asking 1-2 questions of each pro over the course of the project can be combined to get a full understanding of the quality of other pros' work. These judgements could be anonymous to avoid conflict.

Data on accuracy of the judgment of the pros in verifying work, which can be used to help weight the validity of future judgments.

A model to identify the most important key questions to ask about the work that would most accurately grade the overall project quality. For example, if a normal set of five quality assessment questions for a paint job are asked, historical data could be analyzed over time to identify a single question that could act as a proxy for the rest. This would dramatically reduce the burden of data collection.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. At least one non-transitory computer-readable medium on which are stored instructions that, when executed by one or more processing devices, enable the one or more processing devices to perform a method, the method comprising the steps of:
   providing over a network a request for first information from a second service provider of a service at a job site characterizing a first service provided by a first service provider at the job site;
   receiving over the network from the second service provider the first information;
   providing over the network a request for second information from a third service provider of a service at the job site characterizing a second service provided by the second service provider at the job site;
   receiving over the network from the third service provider the second information, wherein each of the requests for information comprises a question presented on a user interface, each said question being randomly chosen from a set of predetermined questions;
   determining a value characterizing the accuracy of the first information; and
   associating with the second service provider a weight value based on the determined accuracy value.

2. The medium of claim 1, wherein the request for first information comprises one or more requests to characterize the provided first service.

3. The medium of claim 1, wherein the request for second information comprises one or more requests to characterize the provided second service.

4. The medium of claim 2, further comprising selecting the one or more requests based on a reference code identifying the first service.

5. The medium of claim 3, further comprising selecting the one or more requests based on a reference code identifying the second service.

6. The medium of claim 1, wherein the first information comprises one or more photographs of the job site.

7. The medium of claim 1, wherein the second information comprises one or more photographs of the job site.

8. The medium of claim 1, further comprising comparing the first information with previously received information characterizing the first service.

9. The medium of claim 1, further comprising comparing the second information with previously received information characterizing the second service.

* * * * *